(12) United States Patent
Kimura et al.

(10) Patent No.: US 11,352,070 B2
(45) Date of Patent: Jun. 7, 2022

(54) BODY OF ELECTRIC VEHICLE

(71) Applicants: TOYOTA JIDOSHA KABUSHIKI KAISHA, Aichi (JP); SUBARU CORPORATION, Tokyo (JP)

(72) Inventors: Ryo Kimura, Tokyo-to (JP); Tomohiro Matsumoto, Tokyo-to (JP)

(73) Assignees: TOYOTA JIDOSHA KABUSHIKI KAISHA, Aichi-ken (JP); SUBARU CORPORATION, Tokyo (JP)

( * ) Notice: Subject to any disclaimer, the term of this patent is extended or adjusted under 35 U.S.C. 154(b) by 83 days.

(21) Appl. No.: 17/031,905

(22) Filed: Sep. 25, 2020

(65) Prior Publication Data
US 2021/0094626 A1 Apr. 1, 2021

(30) Foreign Application Priority Data
Sep. 26, 2019 (JP) .............................. JP2019-176107

(51) Int. Cl.
*B60K 1/04* (2019.01)
*B62D 25/20* (2006.01)

(52) U.S. Cl.
CPC ............ *B62D 25/2036* (2013.01); *B60K 1/04* (2013.01); *B60K 2001/0438* (2013.01)

(58) Field of Classification Search
CPC .............................. B60K 1/04; B62D 25/2036
See application file for complete search history.

(56) References Cited

U.S. PATENT DOCUMENTS

| | | | | |
|---|---|---|---|---|
| 5,501,289 | A * | 3/1996 | Nishikawa ............ | H01M 50/20 280/783 |
| 6,085,854 | A * | 7/2000 | Nishikawa ........ | H01M 10/6566 180/68.5 |
| 6,227,322 | B1 * | 5/2001 | Nishikawa .............. | B60R 16/04 180/68.5 |
| 11,214,317 | B2 * | 1/2022 | Okoli .................... | B62D 23/005 |
| 2018/0236863 | A1 * | 8/2018 | Kawabe ................... | B60K 1/04 |

FOREIGN PATENT DOCUMENTS

JP 2017226353 A 12/2017

* cited by examiner

*Primary Examiner* — Jonathan Ng
*Assistant Examiner* — James J Triggs
(74) *Attorney, Agent, or Firm* — Hauptman Ham, LLP

(57) ABSTRACT

A body of an electric vehicle may include: a floor panel; a rocker; a first floor crossmember protruding from a first surface of the floor panel and joined to the rocker; a body component protruding from the first surface and extending rearward from the first floor crossmember so as to shift upward toward a rear end of the electric vehicle; a battery case located below the floor panel; a battery case reinforcement extending along a side edge of the battery case, located below the rocker, and extending from a position frontward of the first crossmember to a position rearward of the first crossmember; a first fastening member fastening the battery case reinforcement to the rocker in a range frontward of the first floor crossmember; and a second fastening member fastening the battery case reinforcement to the rocker in a range rearward of the first floor crossmember.

3 Claims, 11 Drawing Sheets

BODY OF ELECTRIC VEHICLE

CROSS-REFERENCE

This application claims priority to Japanese Patent Application No. 2019-176107 filed on Sep. 26, 2019, the contents of which are hereby incorporated by reference into the present application.

TECHNICAL FIELD

The technique disclosed herein relates to a body of an electric vehicle. In the disclosure herein, the electric vehicle means a vehicle configured to travel using electric power stored in a battery. The electric vehicle includes electric cars, hybrid cars, fuel cell cars, etc.

BACKGROUND

A body of an electric vehicle described in Japanese Patent Application Publication No. 2017-226353 includes a battery case (battery pack) below a floor panel. A side sill extends along a side edge of the floor panel. A longitudinal beam extends along a side edge of the battery case. The longitudinal beam is disposed below the side sill. The longitudinal beam is fastened to the side sill with a bolt.

SUMMARY

The disclosure herein provides a technique that mitigates deformation of a floor panel in the event of a rear-end collision, in a body including a battery case below the floor panel as described in Japanese Patent Application Publication No. 2017-226353.

A body of an electric vehicle disclosed herein may comprise a floor panel, a rocker, a first floor crossmember, a body component, a battery case, a battery case reinforcement, a first fastening member, and a second fastening member. The rocker may extend along a side edge of the floor panel. The first floor crossmember may protrude from a first surface of the floor panel, extend along a right-left direction, and be joined to the rocker. The first surface may be one of an upper surface and a lower surface of the floor panel. The body component may protrude from the first surface, be joined to the first floor crossmember, extend rearward from the first floor crossmember along the side edge of the floor panel so as to shift upward toward a rear end of the electric vehicle. The battery case may be located below the floor panel and house a battery configured to supply power to a traction motor. The battery case reinforcement may extend along a side edge of the battery case, be located below the rocker, and extend from a position located frontward of the first crossmember to a position located rearward of the first crossmember. The first fastening member may fasten the battery case reinforcement to the rocker in a range located frontward of the first floor crossmember. The second fastening member may fasten the battery case reinforcement to the rocker in a range located rearward of the first floor crossmember.

The body component may be a rear side member or a reinforcement configured to reinforce a rear side member.

In the event of a rear-end collision to the vehicle, a frontward load is applied to the body component in the above-described body. Since the body component extends rearward from the first floor crossmember so as to shift upward toward the rear end of the vehicle, when the frontward load is applied to the body component, a moment load is applied to the floor panel in the vicinity of the first floor crossmember. In this body, the battery case reinforcement extends from a position located frontward of the first floor crossmember to a position located rearward of the first floor crossmember, the first fastening member fastens the battery case reinforcement to the rocker in a range located frontward of the first floor crossmember, and the second fastening member fastens the battery case reinforcement to the rocker in a range located rearward of the first floor crossmember. Thus, the battery case reinforcement reinforces a portion of the floor panel where the moment load is applied (i.e., portion of the floor panel in the vicinity of the first floor crossmember). This mitigates deformation of the floor panel in the event of a rear-end collision to the vehicle.

DETAILED DESCRIPTION

Figure 1:
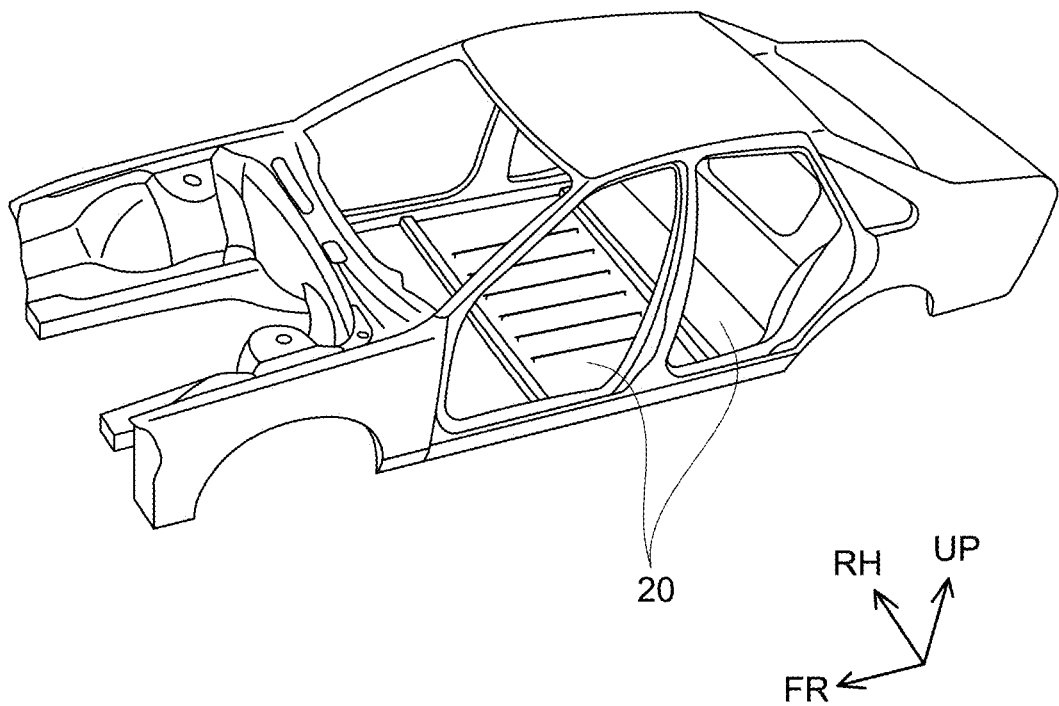
FIG. 1 is a perspective view of a body 10 of an electric vehicle.

A traction motor is mounted on an electric vehicle of an embodiment. The electric vehicle travels by having the traction motor driving its wheels. FIG. 1 shows a body 10 of the electric vehicle of the embodiment. The body 10 includes a floor panel 20. The embodiment to be described hereinbelow relates to a rear portion of the floor panel 20 and a surrounding structure around the rear portion. In the drawings including FIG. 1, an arrow FR indicates a front direction of the vehicle, an arrow RH indicates a right direction of the vehicle, and an arrow UP indicates an up direction of the vehicle.

Figure 2:
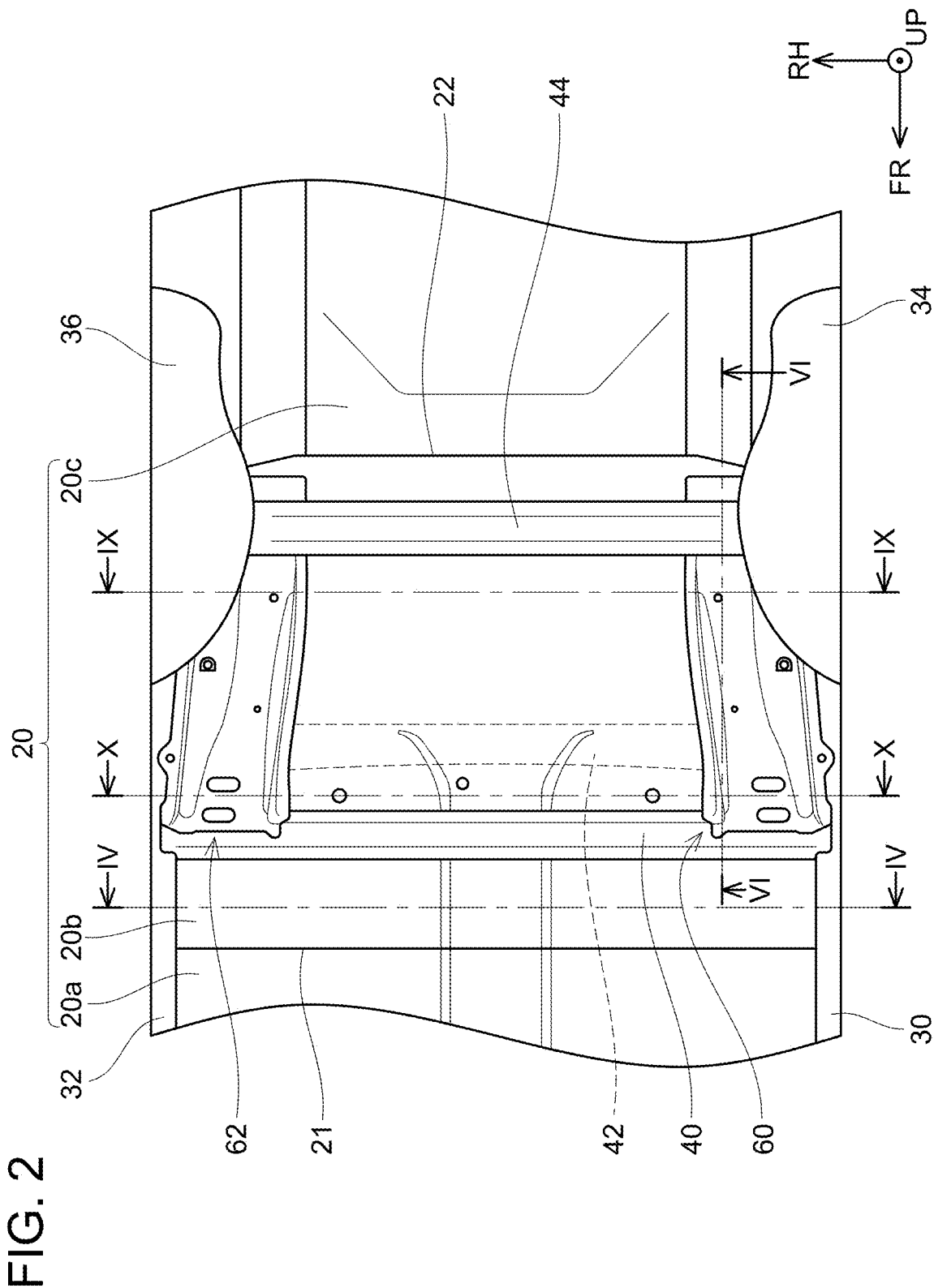
FIG. 2 is a planar view of an underbody from above.
Figure 3:
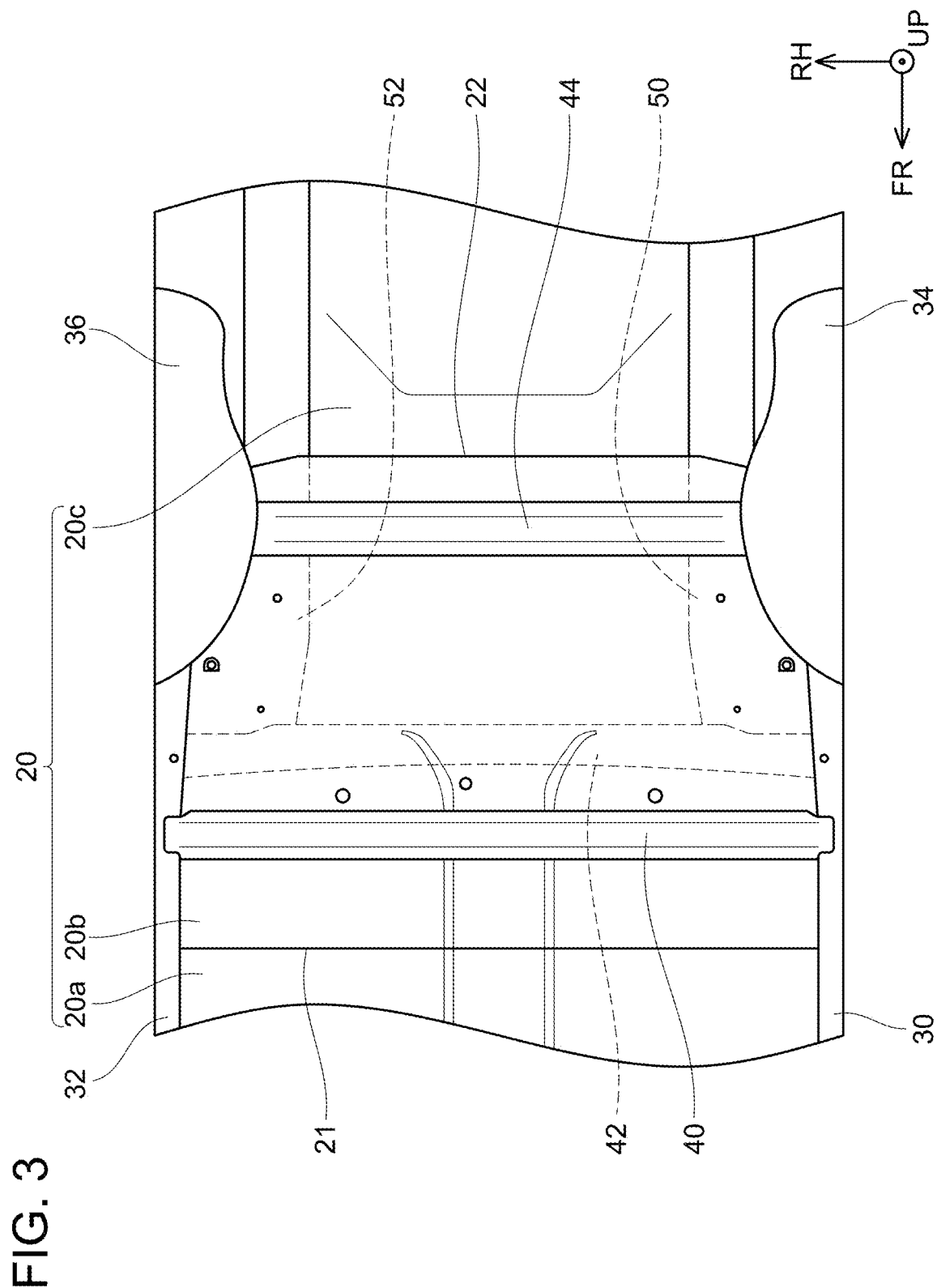
FIG. 3 is a planar view corresponding to FIG. 2, with reinforcements 60, 62 omitted.

FIGS. 2 and 3 each show a planar view of an underbody of the body 10 from above. The planar view of FIG. 2 includes reinforcements 60, 62 disposed on the floor panel 20, while the reinforcements 60, 62 are removed in the planar view of FIG. 3.

As shown in FIGS. 2 and 3, the floor panel 20 includes a front floor panel 20a, a rear floor panel 20b, and a luggage floor panel 20c. From the front to rear of the vehicle, the front floor panel 20a, the rear floor panel 20b, and the luggage floor panel 20c are arranged in this order. Each of the front floor panel 20a, the rear floor panel 20b, and the luggage floor panel 20c consists of a single steel plate (a single plate). A front edge 21 of the rear floor panel 20b is welded to the front floor panel 20a. A rear edge 22 of the rear floor panel 20b is welded to the luggage floor panel 20c. That is, the rear floor panel 20b constitutes a portion of the floor panel between the front edge 21 to the rear edge 22. The front floor panel 20a and the rear floor panel 20b constitute a cabin floor. The luggage floor panel 20c constitutes a luggage space floor.

Figure 4:
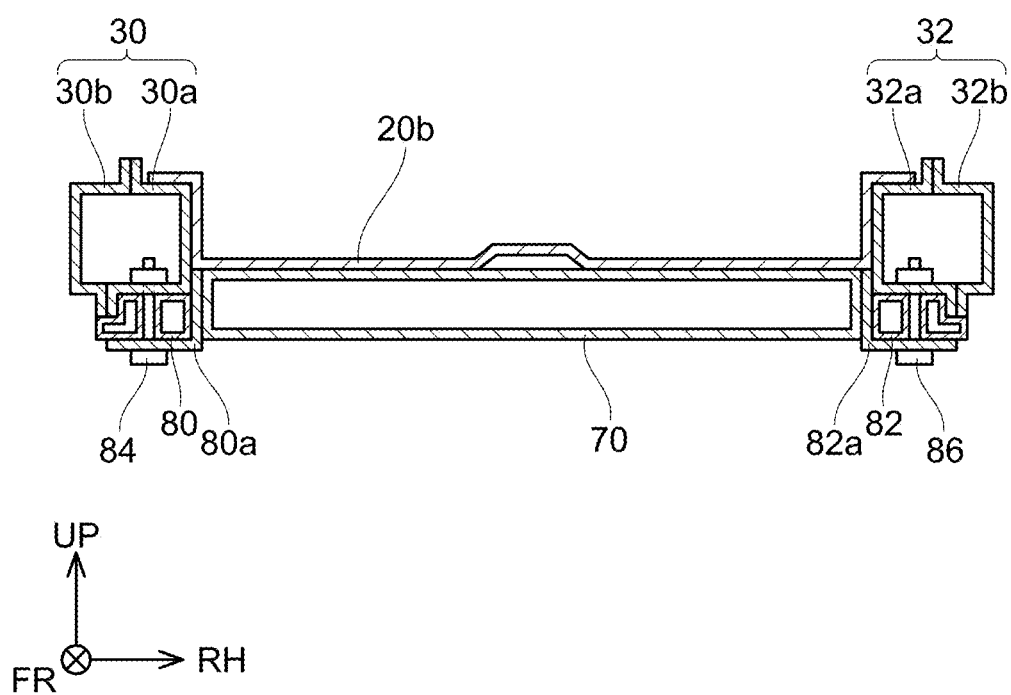
FIG. 4 is a cross-sectional view of the underbody along a line IV-TV in FIG. 2.

As shown in FIGS. 2 and 3, a pair of rockers (a left rocker 30 and a right rocker 32) is disposed at both of side edges of the floor panel 20, respectively. FIG. 4 shows a cross-sectional view of the underbody cut at a position including the left rocker 30 and the right rocker 32 (at a position of line IV-IV in FIG. 2). As shown in FIG. 4, the left rocker 30 includes an inner rocker 30a and an outer rocker 30b. Each of the inner rocker 30a and the outer rocker 30b is an elongated member having a U-shaped cross section, and extends long in a front-rear direction. The inner rocker 30a and the outer rocker 30b are assembled and welded to each other such that they form an inner space. Thus, the left rocker 30 has a hollow prism shape and extends long in the front-rear direction. As shown in FIGS. 2 and 3, the left rocker 30 is arranged along the left edge of the floor panel 20. The left rocker 30 is joined to the front floor panel 20a and the rear floor panel 20b, for example, by welding. As shown in FIG. 4, the right rocker 32 includes an inner rocker 32a and an outer rocker 32b joined to each other, similar to the left rocker 30. The right rocker 32 has a hollow prism shape and extends long in the front-rear direction. As shown in FIGS. 2 and 3, the right rocker 32 is arranged along the right edge of the floor panel 20. The right rocker 32 is joined to the front floor panel 20a and the rear floor panel 20b, for example, by welding.

As shown in FIGS. 2 and 3, a pair of wheel house panels (a left wheel house panel 34 and a right wheel house panel 36) is disposed at both of the side edges of the floor panel 20, respectively. The left wheel house panel 34 is fixed to the left edge of the floor panel 20 at a position rearward of the left rocker 30. The left wheel house panel 34 is a concavely curved plate and is fixed to the floor panel 20 with the concave portion facing outward and downward. The concave portion of the left wheel house panel 34 houses a left rear tire, for example. The left wheel house panel 34 is joined to the rear floor panel 20b and the like, for example, by welding. The right wheel house panel 36 is fixed to the right edge of the floor panel 20 at a position rearward of the right rocker 32. The right wheel house panel 36 is a concavely curved plate and is fixed to the floor panel 20 with the concave portion facing outward and downward. The concave portion of the right wheel house panel 36 houses a right rear tire, for example. The right wheel house panel 36 is joined to the rear floor panel 20b and the like, for example, by welding.

As shown in FIGS. 2 and 3, an indoor floor crossmember 40 and a rear floor crossmember 44 are disposed on an upper surface of the rear floor panel 20b.

Figure 5:
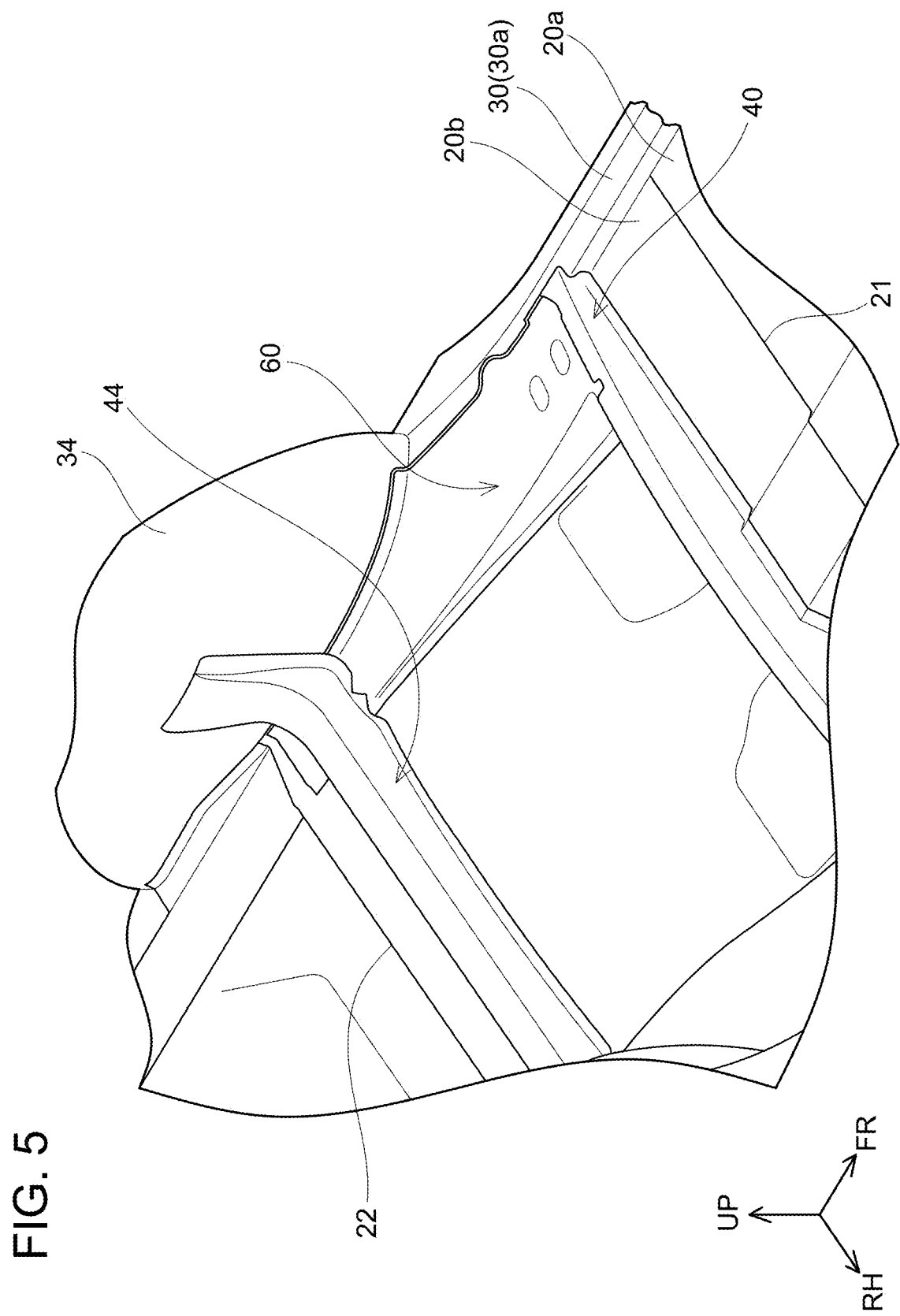
FIG. 5 is a perspective view of an area around a left reinforcement 60 from obliquely above.
Figure 6:
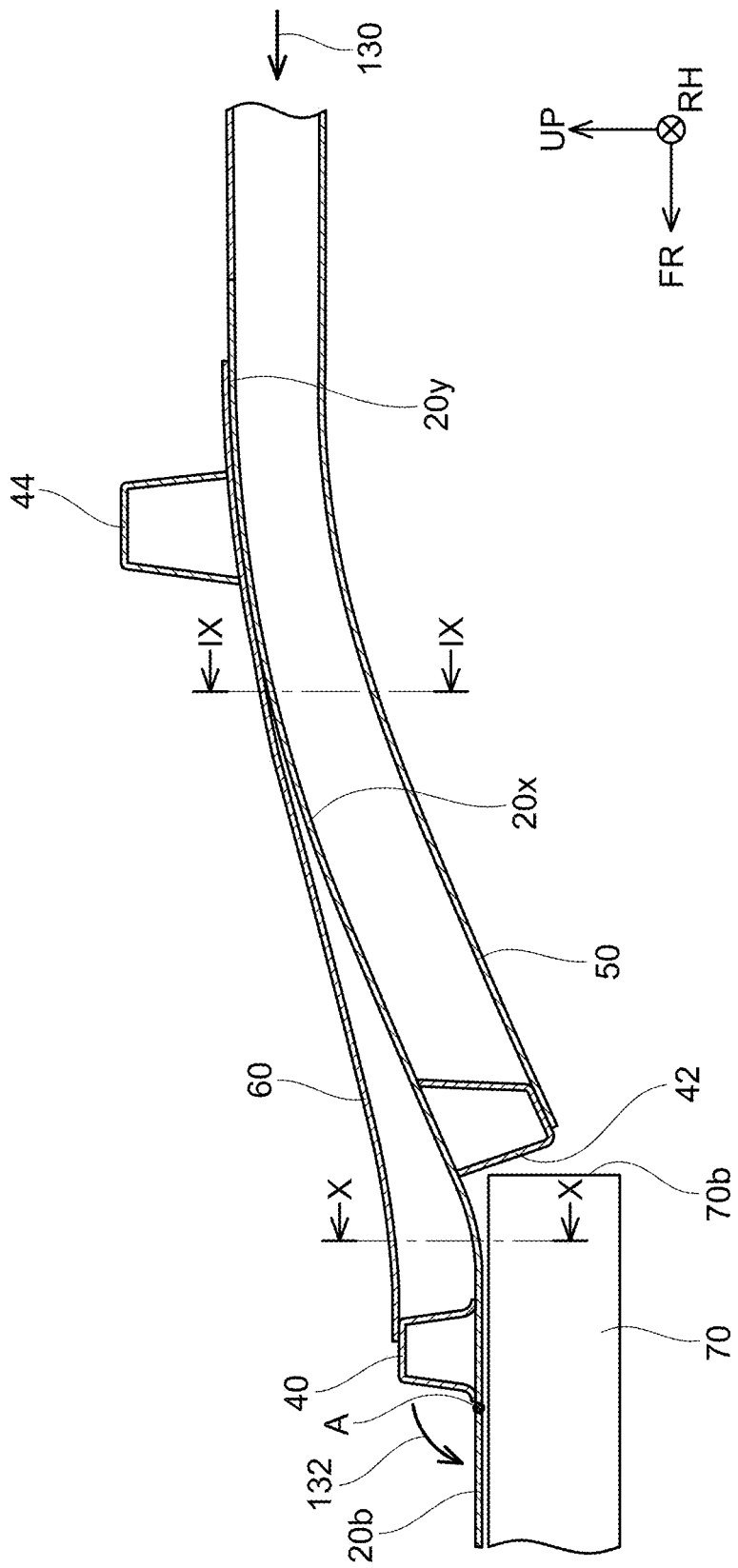
FIG. 6 is a cross-sectional view of the underbody along a line VI-VI in FIG. 2.

FIG. 5 is a perspective view of an area including the indoor floor crossmember 40 and the rear floor crossmember 44 from a right-front side. FIG. 6 is a cross-sectional view of the underbody along a line VI-VI in FIG. 2. As shown in FIGS. 5 and 6, the indoor floor crossmember 40 is a member having a beam shape and a U-shaped cross setion. The indoor floor crossmember 40 is disposed to protrude upward from the rear floor panel 20b. The indoor floor crossmember 40 extends long in a right-left direction. As shown in FIGS. 2 and 3, the indoor floor crossmember 40 extends from the left rocker 30 to the right rocker 32. The indoor floor crossmember 40 is joined to the rear floor panel 20b, the left rocker 30, and the right rocker 32, for example, by welding.

As shown in FIGS. 5 and 6, the rear floor crossmember 44 is a member having a beam shape and a U-shaped cross section. The rear floor crossmember 44 is disposed to protrude upward from the rear floor panel 20b. The rear floor crossmember 44 extends long in the right-left direction. The rear floor crossmember 44 is located rearward of the indoor floor crossmember 40. As shown in FIGS. 2 and 3, the rear floor crossmember 44 extends from the left wheel house panel 34 to the right wheel house panel 36. The rear floor crossmember 44 is joined to the rear floor panel 20b, the left wheel house panel 34, and the right wheel house panel 36, for example, by welding.

Figure 7:
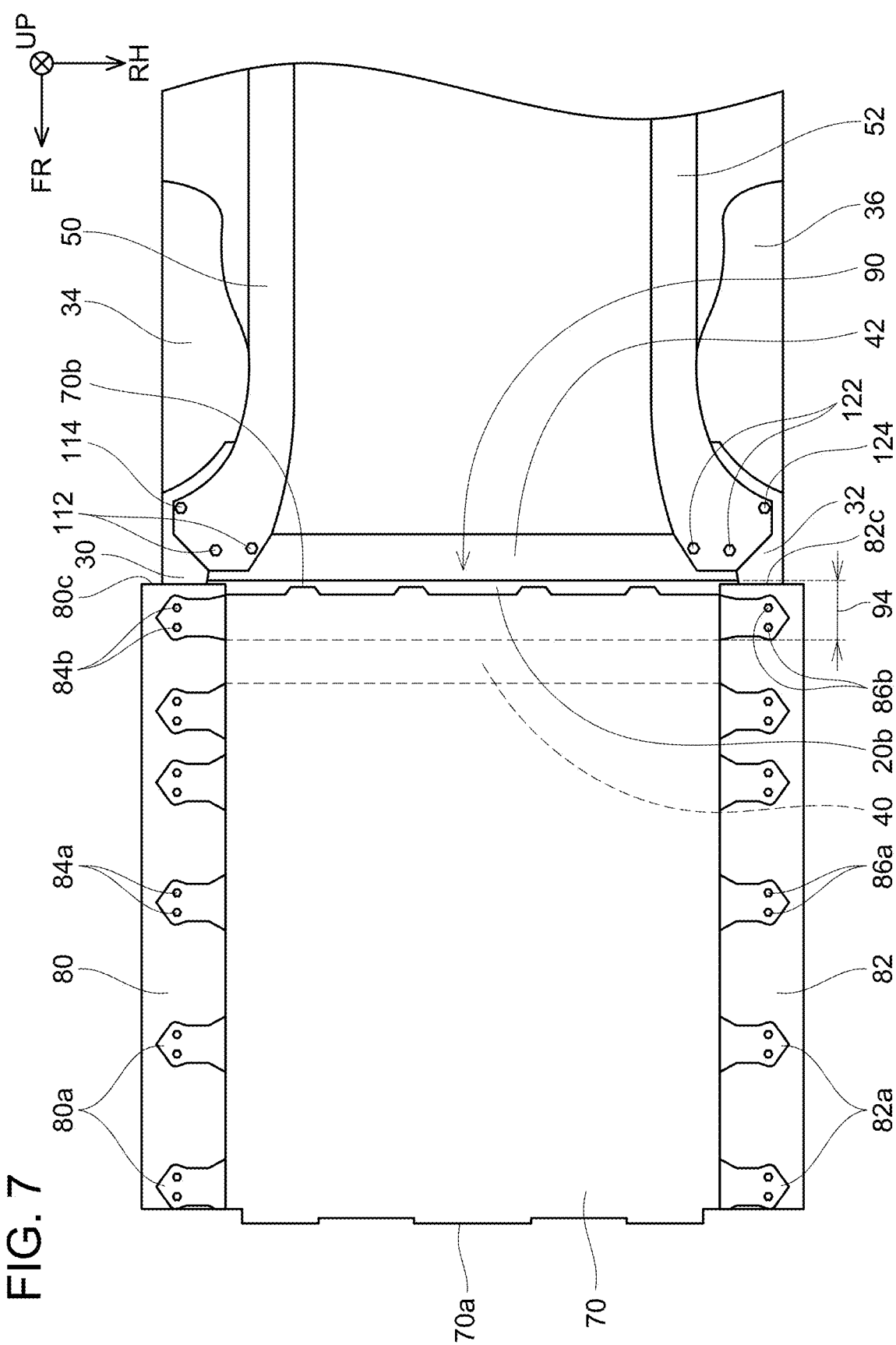
FIG. 7 is a planar view of the underbody from below.

As shown in FIGS. 6 and 7, an outdoor floor crossmember 42 is disposed on a lower surface of the rear floor panel 20b. The outdoor floor crossmember 42 is a member having a beam shape and a U-shaped cross section. The outdoor floor crossmember 42 is disposed to protrude downward from the rear floor panel 20b. The outdoor floor crossmember 42 extends long in the right-left direction. The outdoor floor crossmember 42 is located rearward of the indoor floor crossmember 40. The outdoor floor crossmember 42 is located frontward of the rear floor crossmember 44. The outdoor floor crossmember 42 extends from the left rocker 30 to the right rocker 32. The outdoor floor crossmember 42 is joined to the rear floor panel 20b, the left rocker 30, and the right rocker 32, for example, by welding.

The rear floor panel 20b extends to a position frontward of the indoor floor crossmember 40 and also extends to a position rearward of the outdoor floor crossmember 42 and the rear floor crossmember 44. As shown in FIG. 6, a portion of the rear floor panel 20b that is located frontward of the indoor floor crossmember 40 extends horizontally. A portion of the rear floor panel 20b that is within a range located rearward of the indoor floor crossmember and frontward of the rear floor crossmember 44 (especially, a range rearward of the outdoor floor crossmember 42) is inclined so as to shift upward toward a rear end of the vehicle. A portion of the rear floor panel 20b that is located rearward of the rear floor crossmember 44 extends horizontally. Hereinbelow, the portion of the rear floor panel 20b that is inclined so as to shift upward toward the rear end of the vehicle will be termed an inclined portion 20x, and the portion of the rear floor panel 20b that is located rearward of the inclined portion 20x and extends horizontally will be termed a horizontal portion 20y.

As shown in FIGS. 4 and 7, a battery case 70 is disposed below the floor panel 20. The battery case 70 is a sealed container and houses a main battery. The main battery is configured to supply electric power to the traction motor. A pair of EA (Energy Absorption) members (a left EA member 80 and a right EA member 82) is disposed on left and right sides of the battery case 70, respectively. Each of the left EA member 80 and the right EA member 82 is a member configured to reinforce the battery case 70 as well as an energy absorber configured to absorb energy in the event of a rear-end collision to the vehicle. The left EA member 80 has a hollow prism shape and extends long in the front-rear direction. The left EA member 80 is arranged along a left edge of the battery case 70. The left EA member 80 is fixed to the battery case 70 via a plurality of fixing plates 80a. The left EA member 80 is located below the left rocker 30. The left EA member 80 is fastened to the inner rocker 30a of the left rocker 30 with a plurality of bolts 84 (bolts 84a and 84b in FIG. 7). The bolts 84 fasten the left EA member 80, together with the fixing plates 80a, to the inner rocker 30a.

That is, the battery case 70 is fixed to the left rocker 30 via the left EA member 80. The right EA member 82 has a hollow prism shape and extends long in the front-rear direction. The right EA member 82 is arranged along a right edge of the battery case 70. The right EA member 82 is fixed to the battery case 70 via a plurality of fixing plates 82a. As shown in FIG. 4, the right EA member 82 is located below the right rocker 32. As shown in FIGS. 4 and 7, the right EA member 82 is fastened to the inner rocker 32a of the right rocker 32 with a plurality of bolts 86 (bolts 86a and 86b in FIG. 7). The bolts 86 fasten the right EA member 82, together with the fixing plates 82a, to the inner rocker 32a. That is, the battery case 70 is fixed to the right rocker 32 via the right EA member 82.

As shown in FIG. 7, a front edge 70a of the battery case 70 is located near a front end of the cabin. As shown in FIG. 7, a rear edge 70b of the battery case 70 is located within a range 94 that is located rearward of the indoor floor crossmember 40 and frontward of the outdoor floor crossmember 42. In other words, the battery case 70 extends from a position frontward of the indoor floor crossmember 40 to a position that is rearward of the indoor floor cross ember 40 and frontward of the outdoor floor crossmember 42.

Figure 8:
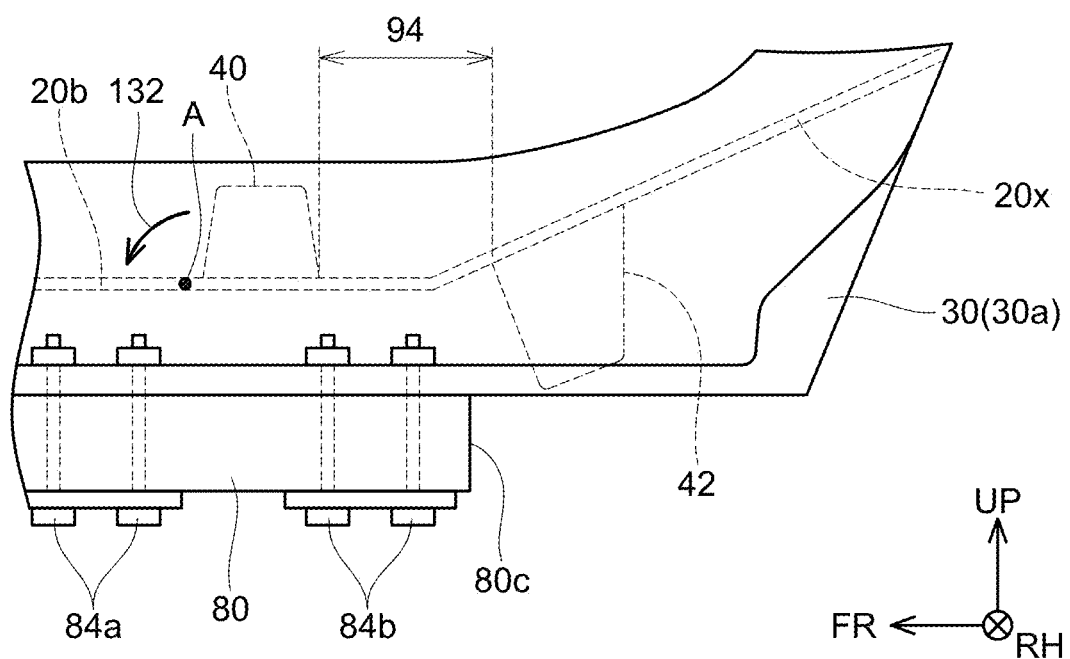
FIG. 8 is a planar view of the underbody from left (with an outer rocker omitted).

As shown in FIGS. 7 and 8, a rear end 80c of the left EA member 80 is located within the range 94 which is rearward of the indoor floor crossmember 40 and frontward of the outdoor floor crossmember 42. In other words, the left EA member 80 extends from a position frontward of the indoor floor crossmember 40 to a position that is rearward of the indoor floor crossmember 40 and frontward of the outdoor floor crossmember 42. As described, the left EA member 80 is fastened to the left rocker 30 with the bolts 84. As shown in FIGS. 7 and 8, the left EA member 80 is fastened to the left rocker 30 with the bolts 84 in each of a range located frontward of the indoor floor crossmember 40 and the range located rearward of the indoor floor crossmember 40 (i.e., the range 94). In FIGS. 7 and 8, the bolts 84 that are located within the range frontward of the indoor floor crossmember 40 are indicated as the bolts 84a, and the bolts 84 that are located within the range 94 rearward of the indoor floor crossmember 40 are indicated as the bolts 84b. In the range frontward of the indoor floor crossmember 40, the left EA member 80 is fastened to the left rocker 30 with the bolts 84a which are arranged in the front-rear direction at intervals. In the range 94 rearward of the indoor floor crossmember 40, the left EA member 80 is fastened to the left rocker 30 with the bolts 84b which are arranged in the front-rear direction at intervals. As shown in FIG. 7, a rear end 82c of the right EA member 82 is located within the range 94 which is rearward of the indoor floor crossmember 40 and frontward of the outdoor floor crossmember 42. As described, the right EA member 82 is fastened to the right rocker 32 with the bolts 86. As shown in FIG. 7, the right EA member 82 is fastened to the right rocker 32 with the bolts 86 in each of the range frontward of the indoor floor crossmember 40 and the range rearward of the indoor floor crossmember 40 (i.e., the range 94). In FIG. 7, the bolts 86 that are located in the range frontward of the indoor floor crossmember 40 are indicated as the bolts 86a, and the bolts 86 that are located in the range 94 rearward of the indoor floor crossmember 40 are indicated as the bolts 86b. In the range frontward of the indoor floor crossmember 40, the right EA member 82 is fastened to the right rocker 32 with the bolts 86a which are arranged in the front-rear direction at intervals. In the range 94 rearward of the indoor floor crossmember 40, the right EA member 82 is fastened to the right rocker 32 with the bolts 86b which are arranged in the front-rear direction at intervals.

Figure 9:
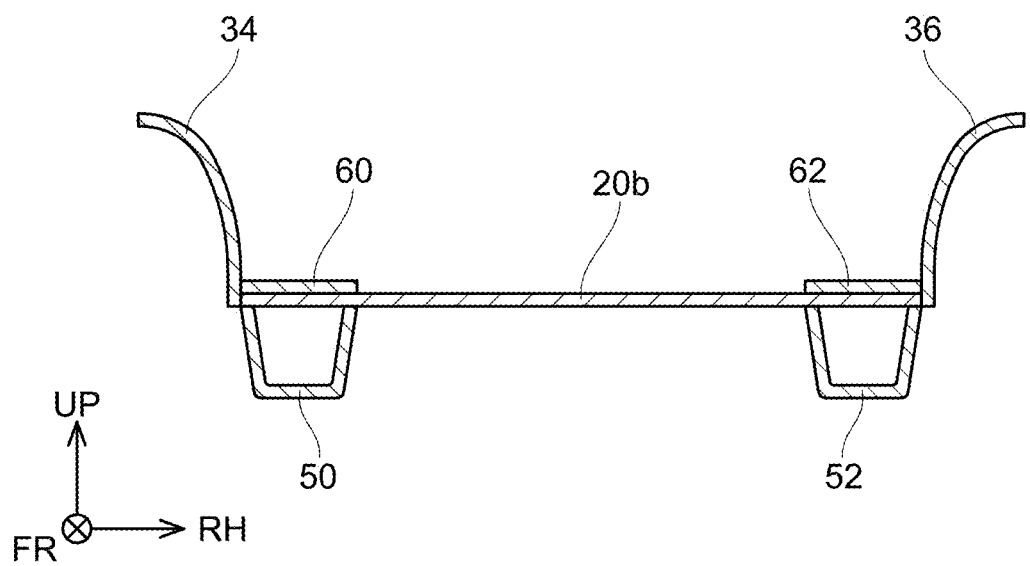
FIG. 9 is a cross-sectional view of the underbody along a line IX-IX in FIG. 2.

FIG. 9 shows a cross-sectional view of the underbody along a line IX-IX in FIGS. 2 and 6. As shown in FIG. 9, a pair of rear side members (a left rear side member 50 and a right rear side member 52) is disposed on the lower surface of the rear floor panel 20b. As shown in FIG. 9, the left rear side member 50 is an elongated member having a U-shaped cross section. The left rear side member 50 is disposed to protrude downward from the rear floor panel 20b. The left rear side member 50 extends long in the front-rear direction. As shown in FIGS. 6 and 7, the left rear side member 50 partially covers a lower surface of the outdoor floor crossmember 42 near a front end of the left rear side member 50. As shown in FIG. 7, the left rear side member 50 is joined to the outdoor floor crossmember 42 by a bolt 112. The left rear side member 50 partially covers a lower surface of the left rocker 30 near the front end of the left rear side member 50. The left rear side member 50 is joined to the left rocker 30 by a bolt 114. As shown in FIGS. 3, 6, and 7, the left rear side member 50 extends rearward from the outdoor floor crossmember 42 along the left edge of the rear floor panel 20b. As shown in FIG. 6, below the inclined portion 20x of the rear floor panel 20b, the left rear side member 50 is inclined to shift upward toward the rear end of the vehicle along the inclined portion 20x. Although not shown, the left rear side member 50 extends up to a rearmost part of the vehicle and is connected to a rear bumper reinforcement at the rearmost part. As shown in FIG. 9, the right rear side member 52 is an elongated member having a U-shaped cross section. The right rear side member 52 is disposed to protrude downward from the rear floor panel 20b. The right rear side member 52 extends long in the front-rear direction. As shown in FIG. 7, the right rear side member 52 partially covers the lower surface of the outdoor floor crossmember 42 near a front end of the right rear side member 52. The right rear side member 52 is joined to the outdoor floor crossmember 42 by a bolt 122. The right rear side member 52 partially covers a lower surface of the right rocker 32 near the front end of the right rear side member 52. The right rear side member 52 is joined to the right rocker 32 by a bolt 124. As shown in FIGS. 3 and 7, the right rear side member 52 extends rearward from the outdoor floor crossmember 42 along the right edge of the rear floor panel 20b. Below the inclined portion 20x of the rear floor panel 20b, the right rear side member 52 is inclined to shift upward toward the rear end of the vehicle along the inclined portion 20x. Although not shown, the right rear side member 52 extends up to the rearmost part of the vehicle and is connected to the rear bumper reinforcement at the rearmost part of the vehicle.

As shown in FIG. 2. a pair of reinforcements (a left reinforcement 60 and a right reinforcement 62) is disposed above/on the rear floor panel 20b. The left reinforcement 60 is joined to the indoor floor crossmember 40, the rear floor panel 20b, the left rocker 30, and the left wheel house panel 34. The right reinforcement 62 is joined to the indoor floor crossmember 40, the rear floor panel 20b, the right rocker 32, and the right wheel house panel 36. The structure of the right reinforcement 62 is symmetric to that of the left reinforcement 60. Thus, detailed description for the structure of the right reinforcement 62 is omitted, and the structure of the left reinforcement 60 will be described in detail hereinbelow.

Figure 10:
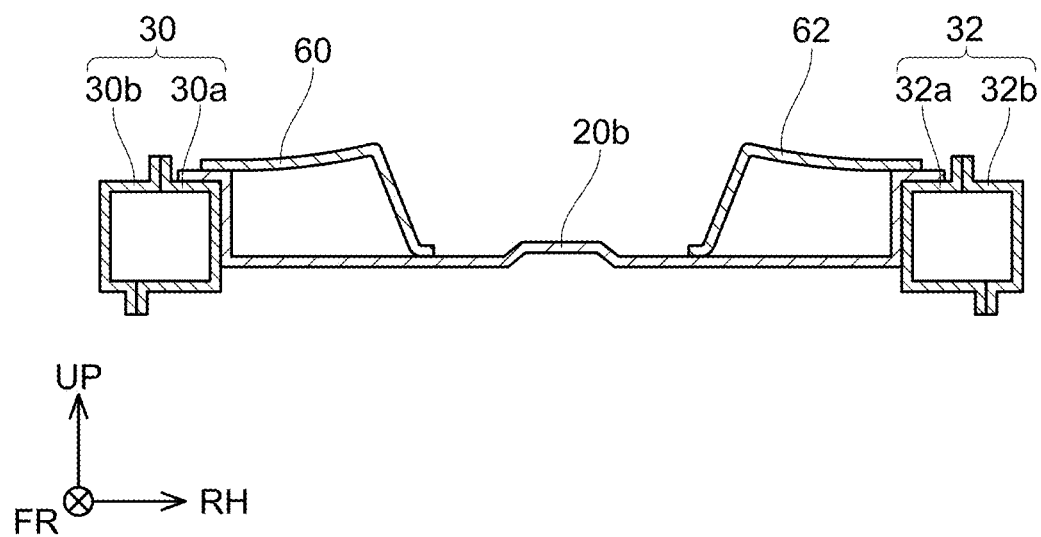
FIG. 10 is a cross-sectional view of the underbody along a line X-X in FIG. 2 (with a battery case 70 omitted).

FIG. 10 shows a cross-sectional view of a part of the underbody that includes the left reinforcement 60 (cut at a position of line X-X in FIG. 2). As shown in FIG. 10, the left reinforcement 60 is a cover-shaped member. The left reinforcement 60 is disposed to protrude upward from the rear floor panel 20b. As shown in FIG. 5, a front end of the left reinforcement 60 partially covers an upper surface of the indoor floor crossmember 40. The front end of the left reinforcement 60 is joined to the indoor floor crossmember 40, for example, by welding. The left reinforcement 60 extends rearward from the indoor floor crossmember 40 along the left edge of the rear floor panel 20b. Together with the rear floor panel 20b, the left reinforcement 60 is joined to the left rocker 30 and the left wheel house panel 34, for example, by welding. As shown in FIG. 6, a top plate of the left reinforcement 60 is inclined to shift upward toward the rear end of the vehicle along the inclined portion 20x of the rear floor panel 20b. The inclination angle of the top plate of the left reinforcement 60 is smaller than the inclination angle of the inclined portion 20x. Thus, in the vicinity of a rear end of the left reinforcement 60, the top plate of the left reinforcement 60 is in surface contact with the rear floor panel 20b. As shown in FIGS. 2 and 3, in the planar view of the rear floor panel 20b from above, the left reinforcement 60 is located to overlap the left rear side member 50. That is, the left reinforcement 60 is located above the left rear side member 50. The left reinforcement 60 is joined to the rear floor panel 20b at a position above the left rear side member 50, for example, by welding. As shown in FIG. 6, the rear end of the left reinforcement 60 is located rearward of the rear floor crossmember 44. The rear end of the left reinforcement 60 is located on the horizontal portion 20y of the rear floor panel 20b. At a position where the rear floor crossmember 44 overlaps the left reinforcement 60, the rear floor crossmember 44 covers the left reinforcement 60 from above.

Next, functions of the above-described body 10 will be described.

As described, in the body 10 of the embodiment, the outdoor floor crossmember 42 is located rearward of the indoor floor crossmember 40. Further, the battery case 70 extends from a position located forward of the indoor floor crossmember 40 to a position located rearward of the indoor floor crossmember 40 and forward of the outdoor floor crossmember 42 (i.e., to a position within the range 94). Arranging the outdoor floor crossmember 42 rearward of the indoor floor crossmember 40 allows the battery case 70 to extend into the range 94, which results from the arrangement, and enables an increase in size of the battery case 70. This enables an increased capacity of the main battery housed in the battery case 70.

Further, in the body 10 of the embodiment, the left reinforcement 60 is disposed above the left rear side member 50. The front end of the left rear side member 50 is joined to the outdoor floor crossmember 42. The left reinforcement 60 is joined to the indoor floor crossmember 40 and is joined to the rear floor panel 20b as well above the left rear side member 50. In this configuration, the left rear side member 50 is reinforced by the left reinforcement 60. Similarly, the right rear side member 52 is reinforced by the right reinforcement 62. Thus, deformation of the left rear side member 50 and the right rear side member 52 is mitigated when the vehicle receives a collision impact from behind.

Further, when the vehicle receives the collision impact from behind, a frontward load is applied to the left rear side member 50 as shown by an arrow 130 in FIG. 6. This load is transmitted from the left rear side member 50 to the rear floor panel 20b via the left reinforcement 60 and the indoor floor crossmember 40. Since the left reinforcement 60 is inclined to shift upward toward the rear end of the vehicle, application of the frontward load to the left reinforcement 60 causes application of a moment load, which is shown by an arrow 132, to the rear floor panel 20b with a front end portion of the indoor floor crossmember 40 (point A in FIG. 6) as the load center. This moment load can bend the rear floor panel 20b. In the body of the embodiment, as shown in FIG. 8, the left EA member 80 extends from the position frontward of the indoor floor crossmember 40 to the position rearward thereof, and the left EA member 80 is fastened to the left rocker 30 with the bolts 84a and 84b in the range frontward of the indoor floor crossmember 40 and the range 94 rearward of the indoor floor crossmember 40, respectively. In this configuration, the rear floor panel 20b is reinforced at the front end portion of the indoor floor crossmember 40 (point A). Thus, the rear floor panel 20b is less likely deformed by the moment load. Specifically, since the left EA member 80 is fastened to the left rocker 30 with the bolts 84b which are arranged in the front-rear direction at intervals in the range 94 rearward of the indoor floor crossmember 40 and with the bolts 84a which are arranged in the front-rear direction at intervals in the range frontward of the indoor floor crossmember 40, the left EA member 80 is less likely deformed by application of a moment load, such as the one shown by the arrow 132, resulting in suitable reinforcement for the rear floor panel 20b. The right EA member 82 reinforces the rear floor panel 20b, similarly. Thus, the body 10 can mitigate deformation of the rear floor panel 20b in the event of a collision to the vehicle from behind. This can achieve higher collision performance than conventional techniques.

Correspondence relationships between constituent elements of the above-described embodiment and constituent elements of the claims will be described. The upper surface of the rear floor panel 20b in the embodiment is an example of first surface in the claims. The reinforcements 60, 62 in the embodiment are examples of body component in the claims. The indoor floor crossmember 40 in the embodiment is an example of first floor crossmember in the claims. The EA members 80, 82 in the embodiment are examples of battery case reinforcement in the claims. The bolts 84a, 86a in the embodiment are examples of first fastening member in the claims. The bolts 84b, 86b in the embodiment are examples of second fastening member in the claims.

Figure 11:
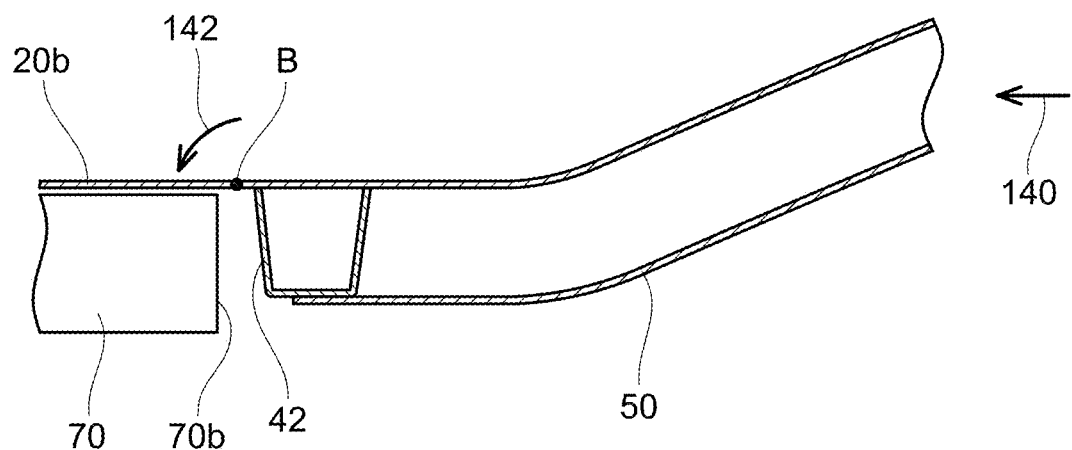
FIG. 11 is a cross-sectional view of a portion of an underbody according to a variant in the vicinity of an outdoor floor crossmember 42, along a front-rear direction.
Figure 12:
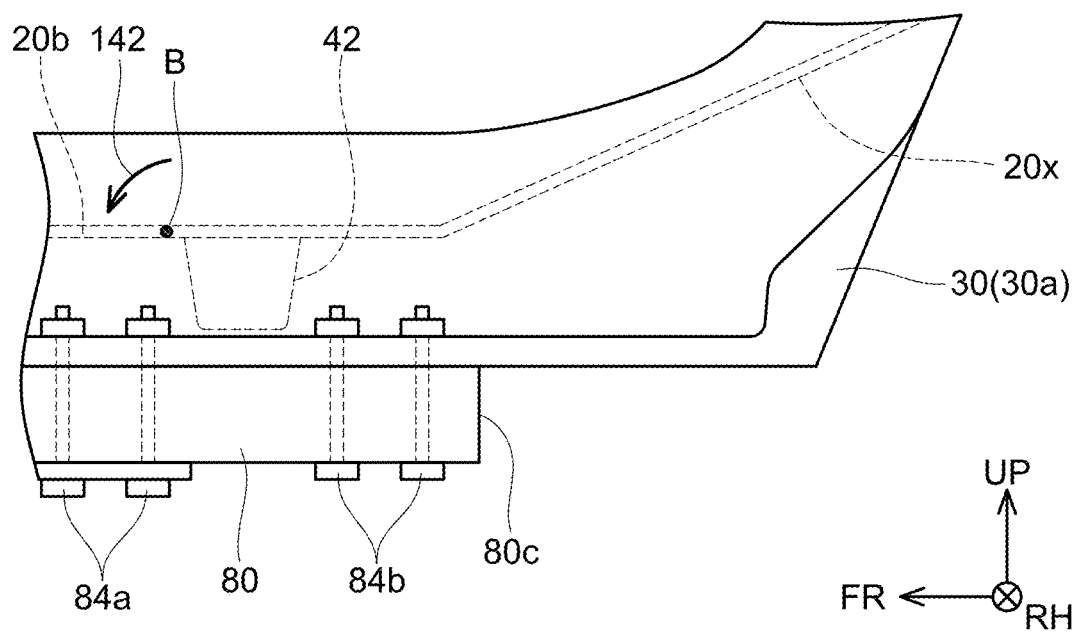
FIG. 12 is a planar view of the underbody according to the variant rom left (with an outer rocker omitted).

The above-described body 10 includes the reinforcements 60, 62, however, a body that does not include the reinforcements 60, 62 can reinforce the rear floor panel 20b by the EA members 80, 82. FIGS. 11 and 12 show a body that does not include the reinforcements 60, 62. As shown in FIG. 11, the battery case 70 is disposed frontward of the outdoor floor crossmember 42. As shown in FIG. 12, the left EA member 80 extends from a position frontward of the outdoor floor crossmember 42 to a position rearward of the outdoor floor crossmember 42. That is, in the configuration of FIGS. 11 and 12, the rear end 80c of the left EA member 80 is located rearward of the rear edge 70b of the battery case 70. The left EA member 80 is fastened to the left rocker 30 with the bolts 84b in a range rearward of the outdoor floor crossmember 42. Further, the left EA member 80 is fastened to the left rocker 30 with the bolts 84a in a range frontward of the outdoor floor crossmember 42. Although not shown, the right EA member 82 includes the similar configuration to the left EA member 80.

In the body of FIGS. 11 and 12, a frontward load is applied to the left rear side member 50, as shown by an arrow 140 in FIG. 6, when the vehicle receives a collision impact from behind. This load is transmitted from the left rear side member 50 to the rear floor panel 20b via the outdoor floor crossmember 42. Since the left rear side member 50 is inclined to shift upward toward the rear end of the vehicle, the application of the frontward load to the left rear side member 50 causes application of a moment load, which is shown by an arrow 142, with a front end portion of the outdoor floor crossmember 42 (point B in FIGS. 11 and 12) as the load center. This moment load can bend the rear floor panel 20*b*. In the configuration in which the left EA member 80 is fastened to the left rocker 30 with the bolts 84*a* and 84*b* respectively in the range frontward of the outdoor floor crossmember 42 and the range rearward thereof, the rear floor panel 20*b* at the front end portion of the outdoor floor crossmember 42 (point B in FIGS. 11 and 12) is reinforced. The right EA member 82 reinforces the rear floor panel 20*b*, similarly to the left EA member 80. Thus, the rear floor panel 20*b* is less likely deformed by the moment load shown by the arrow 142. The body of FIGS. 11 and 12 can mitigate deformation of the rear floor panel 20*b* in the event of a collision to the vehicle from behind, as well.

Correspondence relationships between constituent elements of the embodiment of FIGS. 11, 12 and constituent elements of the claims will be described. The lower surface of the rear floor panel 20*b* in FIGS. 11 and 12 is an example of first surface in the claims. The rear side member 50 in FIGS. 11 and 12 is an example of body component in the claims. The outdoor floor crossmember 42 in FIGS. 11 and 12 is an example of first floor crossmember in the claims. The left EA member 80 in FIGS. 11 and 12 is an example of battery case reinforcement in the claims. The bolts 84*a* in FIGS. 11 and 12 are examples of first fastening member in the claims. The bolts 84*b* in FIGS. 11 and 12 are examples of second fastening member in the claims.

Some of the technical elements disclosed herein will be listed below. It should be noted that the respective technical elements are independent of one another, and are useful solely or in combinations.

In an aspect of body disclosed herein, the body may further comprise a second floor crossmember and a rear side member. The second floor crossmember may protrude from the lower surface of the floor panel, extend along the right-left direction, be joined to the rocker, and be located rearward of the first floor crossmember. The rear side member may protrude from the lower surface of the floor panel, be joined to the second floor crossmember, and extend rearward from the second floor crossmember along the side edge of the floor panel so as to shift upward toward the rear end of the electric vehicle. The first surface may be the upper surface of the floor panel. The battery case reinforcement may extend from a position located frontward of the first floor crossmember to a position that is located rearward of the first floor crossmember and located frontward of the second floor crossmember. The second fastening member may be located in a range that is rearward of the first floor crossmember and frontward of the second floor crossmember.

In this configuration, the body component functions as a reinforcement that reinforces the rear side member.

In an aspect of body disclosed herein, the second fastening member may comprise a plurality of second fastening members which are arranged along a front-rear direction at intervals.

In this configuration, the floor panel can be more suitably reinforced by the battery case reinforcement.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A body of an electric vehicle, comprising:
   a floor panel;
   a rocker extending along a side edge of the floor panel;
   a first floor crossmember protruding from a first surface of the floor panel, extending along a right-left direction, and joined to the rocker, the first surface being one of an upper surface and a lower surface of the floor panel;
   a body component protruding from the first surface, joined to the first floor crossmember, extending rearward from the first floor crossmember along the side edge of the floor panel so as to shift upward toward a rear end of the electric vehicle;
   a battery case located below the floor panel and housing a battery configured to supply power to a traction motor;
   a battery case reinforcement extending along a side edge of the battery case, located below the rocker, and extending from a position located frontward of the first crossmember to a position located rearward of the first crossmember;
   a first fastening member fastening the battery case reinforcement to the rocker in a range located frontward of the first floor crossmember; and
   a second fastening member fastening the battery case reinforcement to the rocker in a range located rearward of the first floor crossmember.

2. The body of claim 1, further comprising:
   a second floor crossmember protruding from the lower surface of the floor panel, extending along the right-left direction, joined to the rocker, and located rearward of the first floor crossmember; and
   a rear side member protruding from the lower surface of the floor panel, joined to the second floor crossmember, and extending rearward from the second floor crossmember along the side edge of the floor panel so as to shift upward toward the rear end of the electric vehicle,
   wherein
   the first surface is the upper surface,
   the battery case reinforcement extends from a position located frontward of the first floor crossmember to a position that is located rearward of the first floor crossmember and located frontward of the second floor crossmember, and
   the second fastening member is located in a range that is rearward of the first floor crossmember and frontward of the second floor crossmember.

3. The body of claim 1, wherein
   the second fastening member comprises a plurality of second fastening members arranged along a front-rear direction at intervals.

* * * * *